Dec. 14, 1948. E. P. REPKE 2,456,320
LIFT TRUCK
Filed Feb. 24, 1947 11 Sheets-Sheet 1

INVENTOR.
Edward P. Repke
BY
Walter M. Fuller
Atty.

Dec. 14, 1948.  E. P. REPKE  2,456,320
LIFT TRUCK
Filed Feb. 24, 1947  11 Sheets-Sheet 2

INVENTOR.
Edward P. Repke
BY
Walter M. Fuller
att

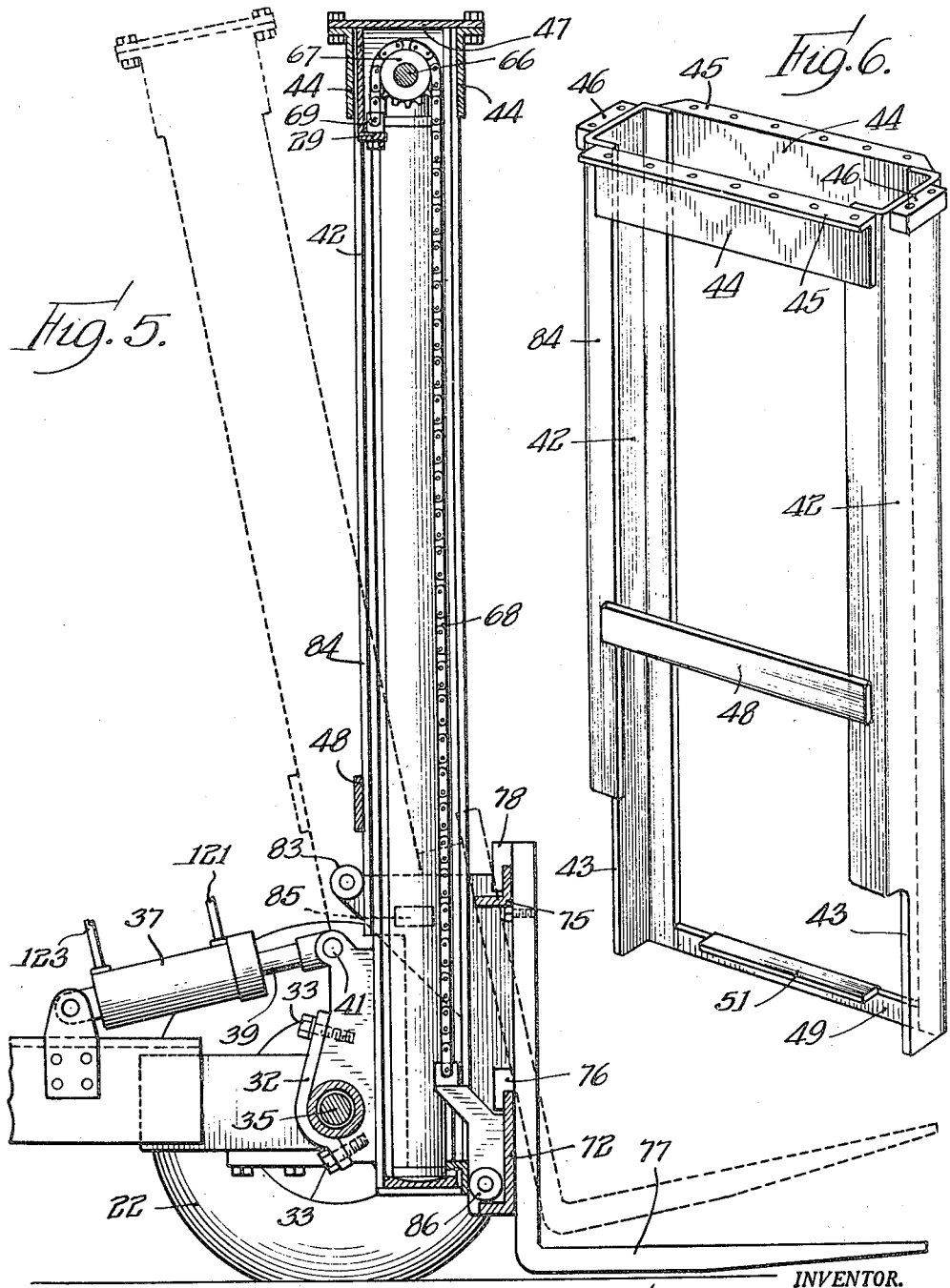

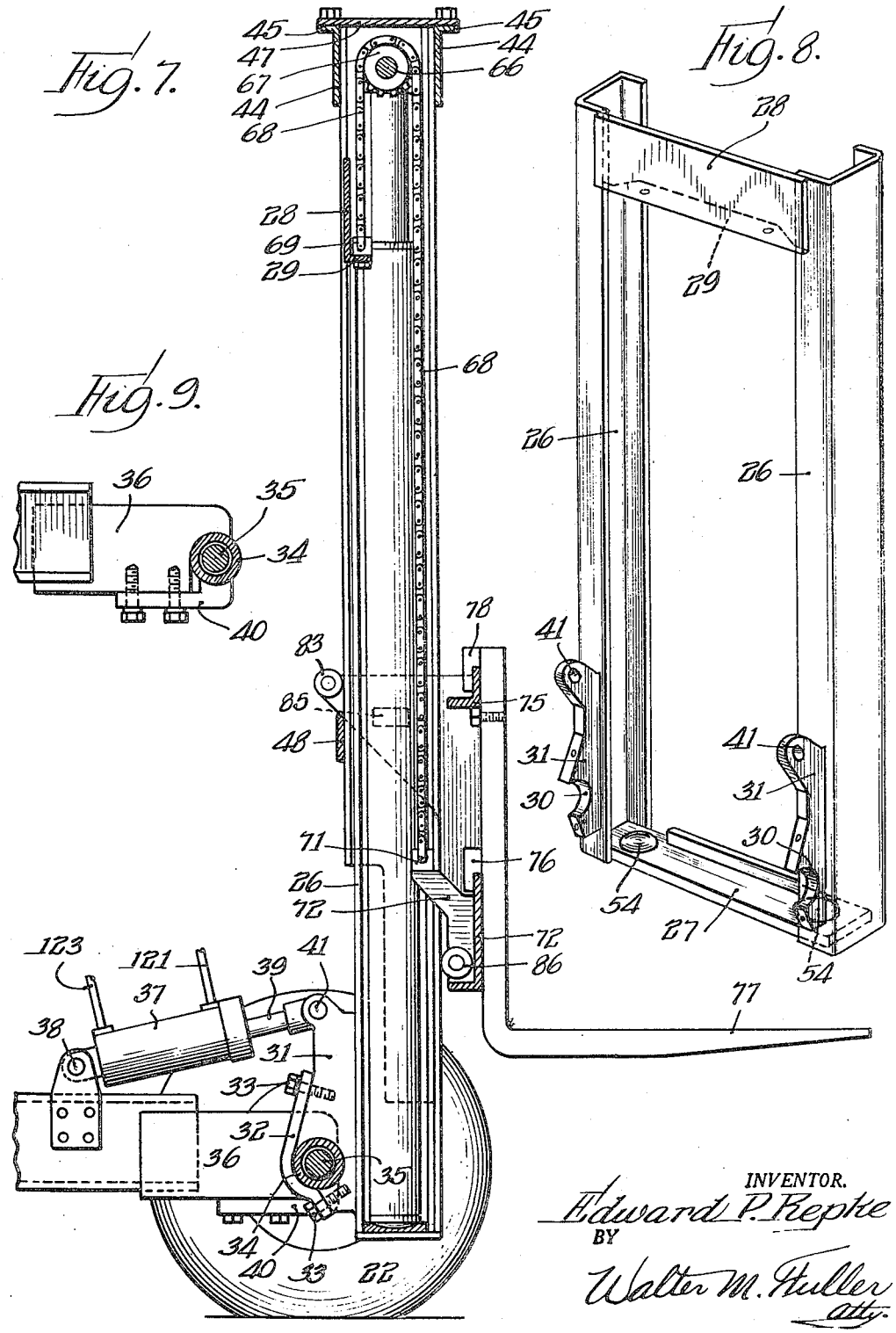

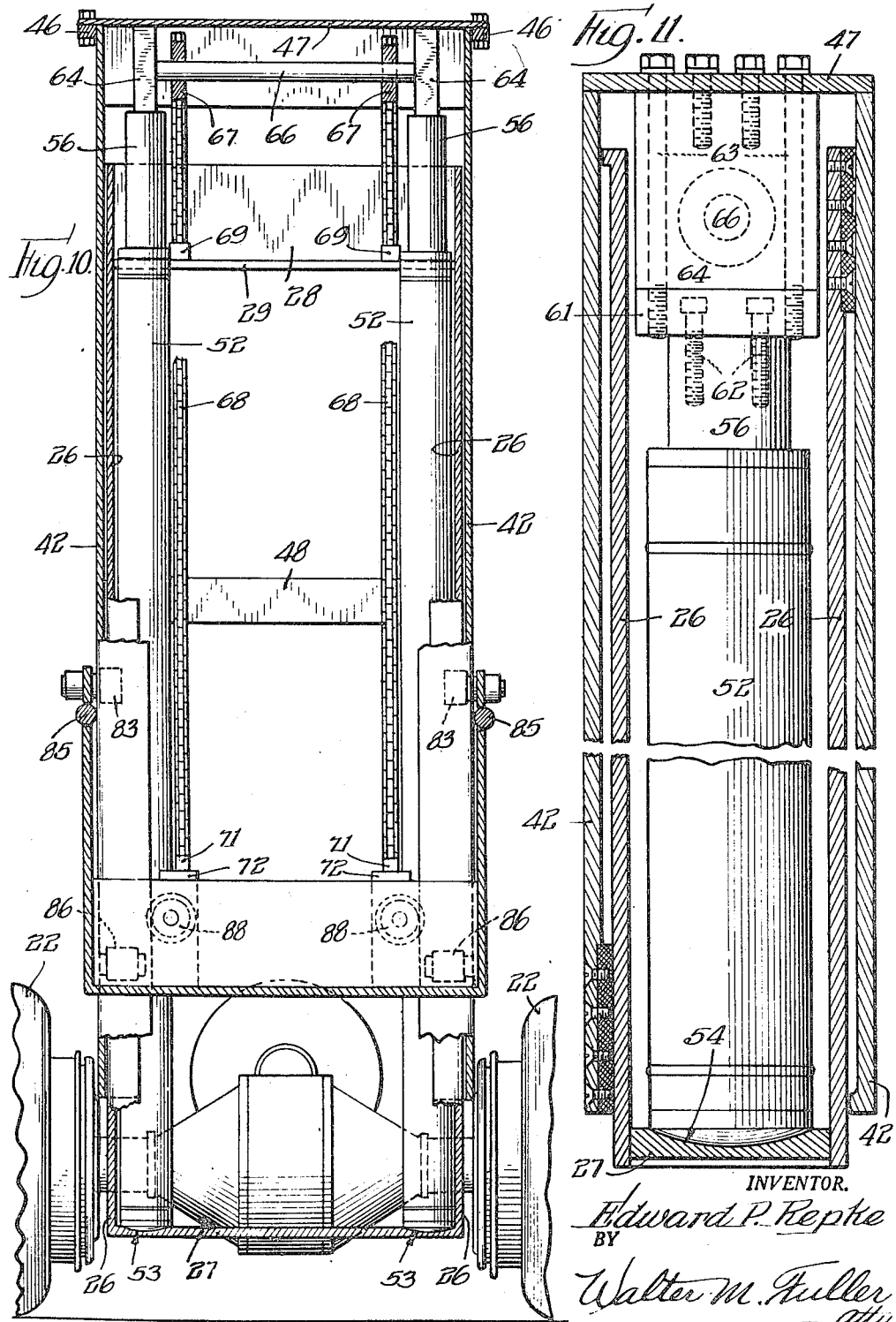

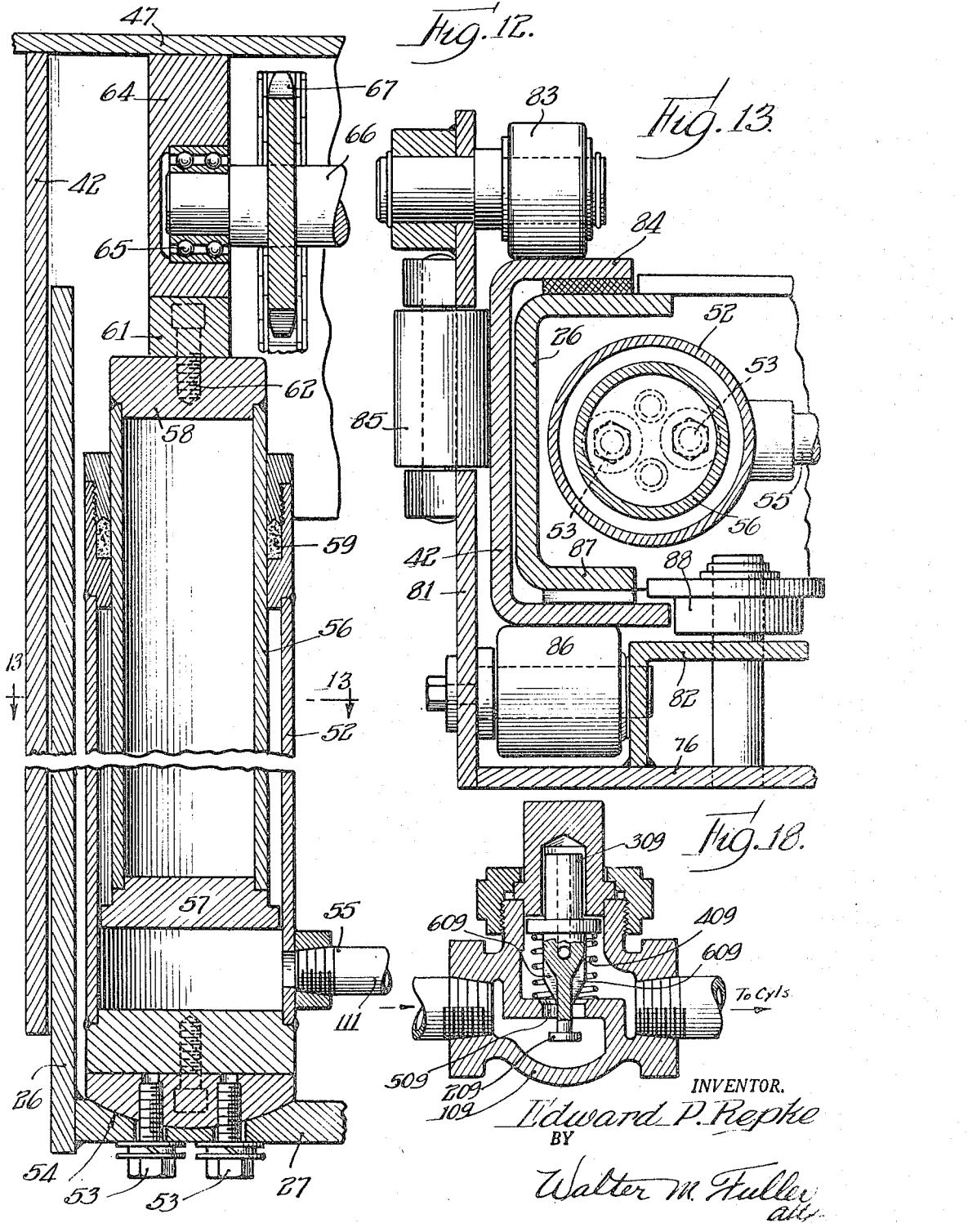

Dec. 14, 1948.  E. P. REPKE  2,456,320
LIFT TRUCK
Filed Feb. 24, 1947  11 Sheets-Sheet 7
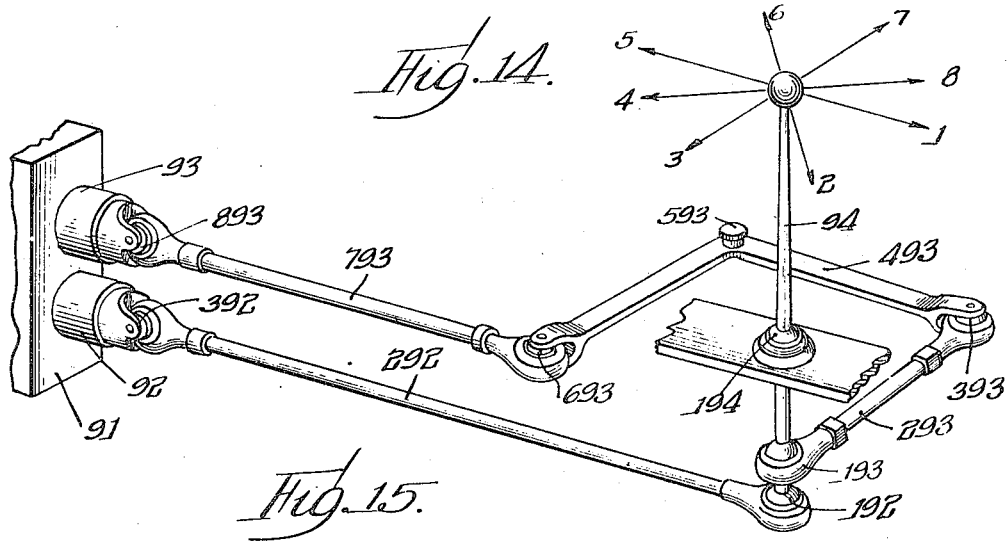
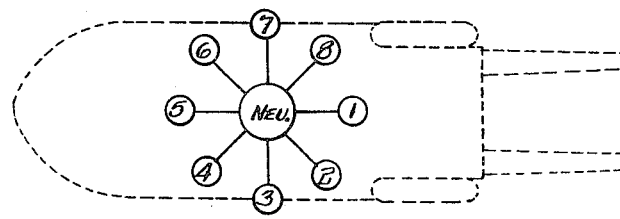
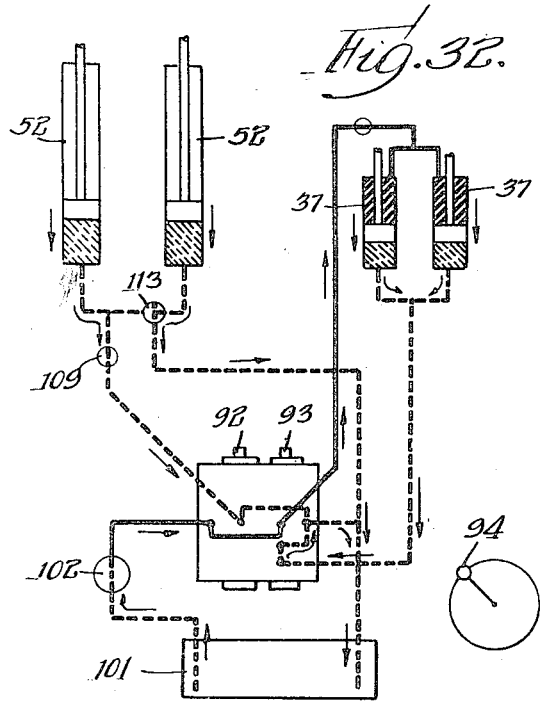
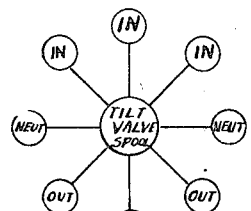
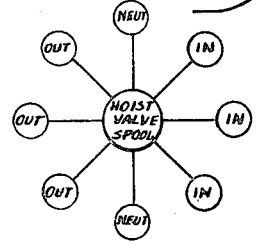
INVENTOR.
Edward P Repke
BY
Walter M Fuller
Atty.

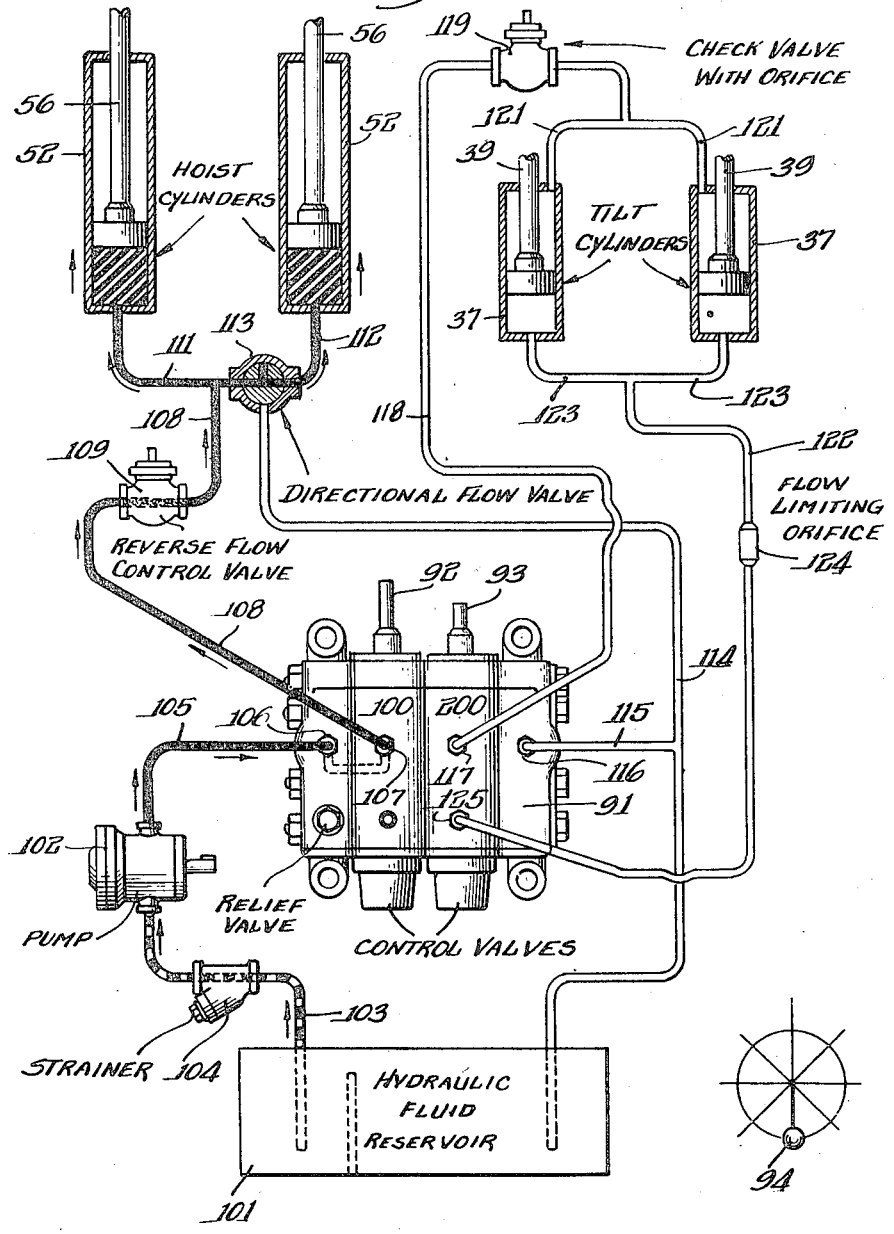

INVENTOR.
Edward P. Repke
BY
Walter M. Fuller
atty.

Dec. 14, 1948.   E. P. REPKE   2,456,320
LIFT TRUCK
Filed Feb. 24, 1947   11 Sheets-Sheet 10

INVENTOR.
BY Edward P. Repke
Walter M. Fuller
atty.

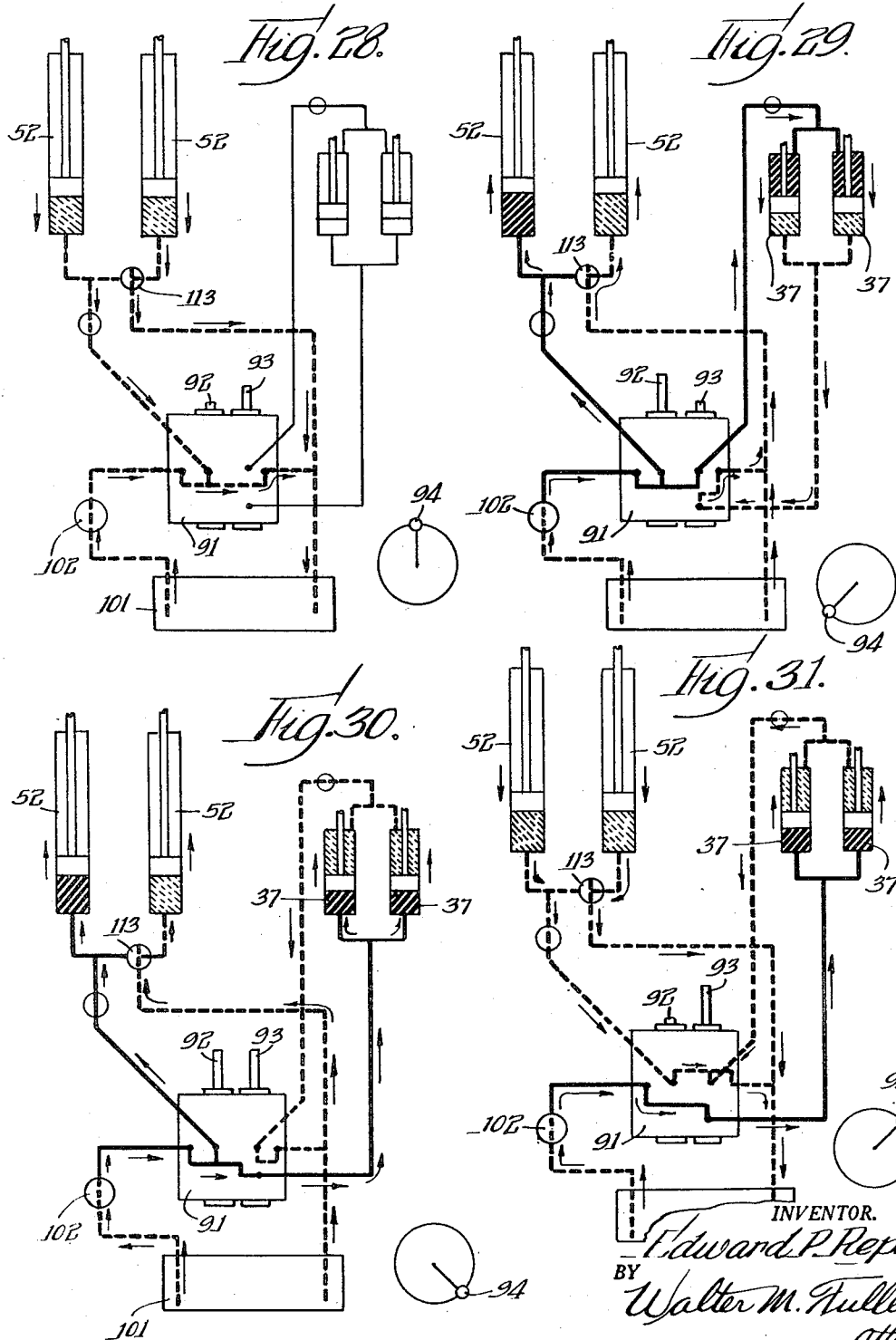

Patented Dec. 14, 1948

2,456,320

UNITED STATES PATENT OFFICE 2,456,320

LIFT TRUCK

Edward P. Repke, Coloma, Mich., assignor to The Ross Carrier Company, Benton Harbor, Mich., a corporation of Michigan Application February 24, 1947, Serial No. 730,355

1 Claim. (Cl. 214—113)

The current invention pertains to certain innovatory features of structure and function in trucks equipped with means at their front ends for engaging loads and lifting and lowering them.

One important aim of the invention is to provide an appliance of this type with improved forward visibility for the truck-operator whereby to better his manipulation of the appliance in picking up and for delivering the load as well as reducing the likelihood of accidents.

Another salient purpose of the invention is to efficiently distribute the strains and stresses incident to the operation of the device on the various coacting elements of the appliance designed to receive and withstand them.

A further cardinal object of the invention is to supply the lifting and lowering structure with a pair of spaced-apart, upright, operating hydraulic-lifts and to render them operable unitedly or singly rather than as a cooperative pair under certain circumstances.

An added main design of the invention is the provision of means to control the lifting, lowering and tilting of the load-carrying means in a novel manner to permit more efficient and effective action of the machine.

In order that those skilled in this art may be fully informed of the structural benefits and operating advantages afforded by the attainment of the above and other material objects and aims of the invention, a present preferred physical embodiment of the latter has been illustrated in detail in the accompanying drawings, forming a part of this specification, and a complete description thereof has been set forth below.

In these drawings:

Figure 5 is a fragmentary, longitudinal, vertical section through the forward portion of the appliance on an enlarged scale and in dotted lines portraying a part of the structure tilted rearwardly;

Figure 6 is a perspective view of the outer vertically movable frame;

Figure 7 is a view similar to that of Figure 5 with the lift partially raised;

Figure 8 is a perspective view of the inner, nonslidable, but tiltable frame;

Figure 9 is a fragmentary part of the frame-tilting means;

Figure 10 is a vertical, transverse section through the apparatus;

Figure 11 is a vertical section through one of the upright posts of the duplex framework;

Figure 12 is an upright cross-section through one of the posts of double frames showing the manner of mounting its unstanding hydraulic-cylinder;

Figure 13 is a horizontal section on line 13—13 of Figure 12;

Figure 14 is a fragmentary perspective view of the handle-actuated means for operating the valves;

Figure 15 is a diagrammatic view of the relation of such handle-means to the body of the tractor;

Figure 1:
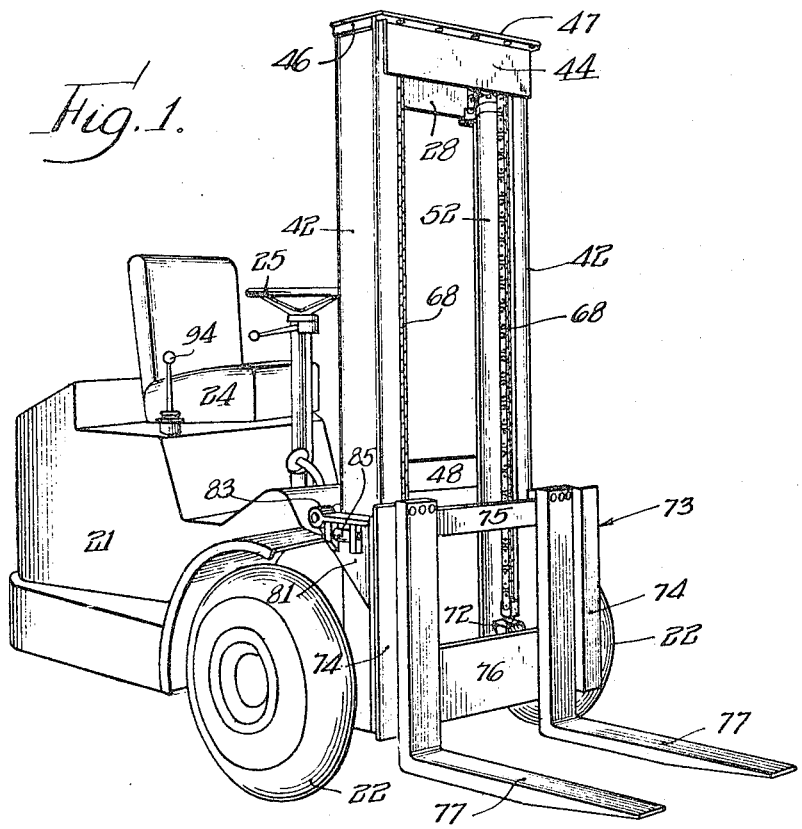
Figure 1 is a front, perspective view of the new lift-truck.

Figures 16 and 17 specify the positions of the sliding stems of the two valves when the handle occupies any one of a plurality of relations;

Figure 18 is a central section through the check-valve used in one of the conduits of the system;

Figure 19 is a diagrammatic view of the oil control system; and

Figures 20 to 32 inclusive are condensed diagrammatic views of the system when performing its variety of operations.

By referring to these several views of the new appliance, it will be noted that the internal-combustion engine-powered truck may be of any appropriate form or style, the one shown, characterized as a whole 21, having a pair of forward, rubber-tired, power-driven ground-wheels 22, 22, the truck being equipped with a third rear steering-wheel 23 controlled by the operator occupying the seat 24 by the usual steering-wheel 25, all other customary controls for the vehicle being within easy reach of such operator.

Fixedly mounted in any approved manner on the front portion of the frame of the truck is an upright inner frame composed of a pair of oppositely-facing channel-bars 26, 26 rigidly connected together at their bottoms by a baseplate 27 and at their tops by another plate 28 having at its lower edge a flange 29 (Figs. 7 and 8).

On the rear surfaces of the inner flanges of channel-bars 26, 26 are fixedly mounted a pair of horizontally-registered brackets 31, 31 of the shape clearly portrayed in Figure 8 and by means of their curved recesses 30, 30 and a pair of complementarily curved bars 32, 32 detachably mounted thereon by screws 33, 33 aligned tubes 34, 34 are accommodated to receive a cross-shaft 35 mounted on the curved-recess frame 36 of the truck by a screw-mounted holding-bar 40 engaging the tube 34, whereby the whole front framework may be tilted rearwardly or forwardly by a pair of hydraulic-cylinders 37, 37 hinged on the truck framework at 38 and whose pistons or plunger rods 39, 39 are hinged to such inner frame at 41, 41.

Encasing this inner, rockable or tiltable frame is an outer, rigid, longitudinally-slidable frame composed of a pair of parallel, opposed, spaced-apart channel-bars 42, 42 cut away at their lower portions (Figs. 5, 6, 11, 12, and 13), each such channel-bar encasing its corresponding inner channel-bar 26, such two elements 42, 42 at the upper ends of their flanges being connected together by a pair of plates 44, 44 (Fig. 6) welded or otherwise secured in place, and each having an outstanding top flange 45, the upper end portions of the outer surfaces of the webs of such members 42, 42 having blocks 46, 46 welded or otherwise secured thereto, a flat cover-plate 47 being bolted to such flanges 45, 45 and to such elements 46, 46 (Fig. 5).

At an intermediate point of their length, the pair of members 42, 42 are fastened together by a cross-bar 48 welded thereto and the lower ends of the two elements 42, 42 are further rigidly secured together by another bar 49 welded in place and having an inwardly-directed flange 51.

In order that such outer frame, composed in part by the channel-bars 42, 42 may be raised and lowered on and relatively to the tiltable, inner frame, incorporating in part the smaller channel-bars 26, 26, mounted partially inside of each bar 26 is an hydraulic-cylinder 52 (Figs. 12 and 13) whose lower, externally-curved surface fits in, and by screws 53, 53 is fixedly mounted in, a socket 54 in base-plate 27 of the inner frame, such cylinder having a pipe or tube connection 55 through which fluid under pressure, oil, for instance, may be admitted into or discharged from the cylinder beneath a hollow piston or plunger 56, closed at its opposite ends by members 57, 58, respectively, such hollow piston being slidable up and down through a suitable sealing-means 59 for the cylinder.

Piston-closure 58 has mounted thereon a block 61 by means of screws 62, 62 and such member 61 is also fastened by screws 63, 63 (Fig. 11) with the top plate 47 of the outer, slidable frame, a rectangular block 64 carrying a ball-bearing 65 filling the entire space directly between the members 61 and 47.

A horizontal shaft 66 (Figs. 5, 7, 12) has its two end portions rotatable in the pair of aligned ball-bearings 65, 65, such shaft having keyed, or otherwise fixed thereon, a pair of sprocket-wheels 67, 67 each cooperating with and interfitting with its own individual chain 68 (Fig. 1), one end of which is fastened at 69 to the flange 29 of the inner tiltable frame, the other end of the chain being secured at 71 (Figs. 2, 7) to a bracket 72 forming part of the lift of the apparatus.

This lifting and lowering member, designated as a whole 73 (Fig. 2), comprises a frame including a pair of upright angle-bars 74, 74 rigidly connected together by an upper angle-bar 75 and a lower angle-plate 76, both welded at their ends to the uprights and carrying the two right-angle lift-forks 77, 77 each of which has a pair of horizontal, spaced-apart hooks 78 and 79 on its upright portion overhanging and slidable toward and from one another on the carrying parts 75 and 76.

Figure 2:
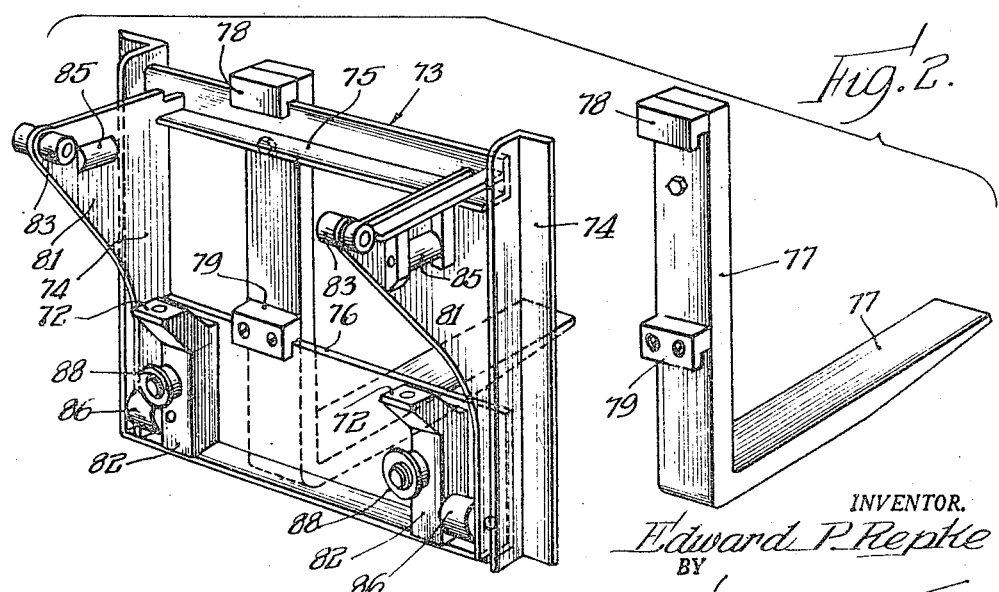
Figure 2 shows the load lifting and lowering means with one of the load-engaging members removed from the support part of the lift.
Figure 3:
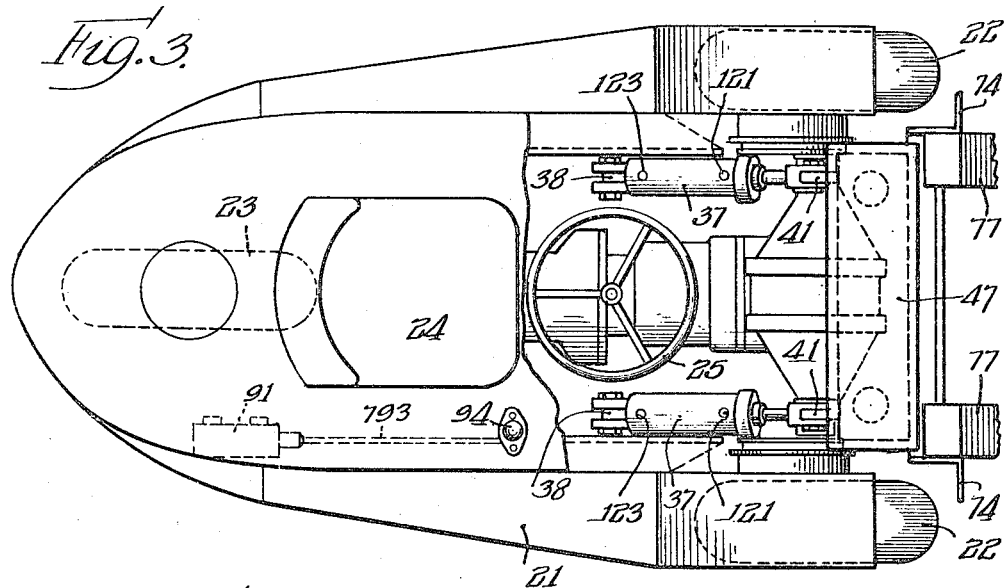
Figure 3 is a plan view of the lift-truck with the forward portion of the load-engaging structure broken away.
Figure 4:
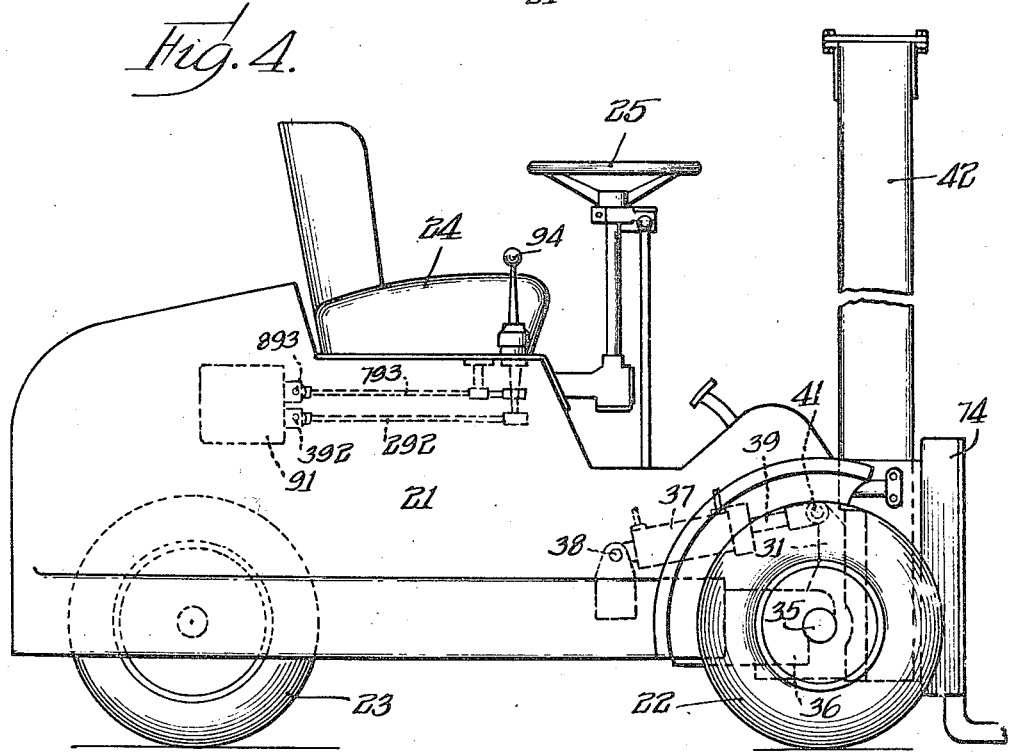
Figure 4 is a side elevation of the construction presented in Figure 3.

This load-lifting framework 73 is slidable vertically longitudinally of the outer power lifted and lowered frame composed in part by the posts 42, 42 and to facilitate such relative movement, this frame 73, by means of suitable brackets 81 and 82, welded or otherwise mounted on its back, having a pair of anti-friction rollers 83, 83 riding on the rear faces of such flanges 84 of the channel-bars 42, another pair of rollers 85, 85 bearing on the webs of the same channel-bars 42, 42, a third couple of rollers 86, 86 engaging the opposite flanges of bars 42, and a fourth doublet of flanged rollers 88, 88 cooperating with the front flanges of bars 42 (Figs. 2, 13).

An important feature of this invention is the fact that the upright members of both the inner and outer frames including their posts, hydraulic-members and the chains are well separated horizontally from one another, whereby they leave an adequate space between them to afford the operator of the vehicle excellent visibility in front of him while advancing the truck to pick up the load by first feeding the truck forward to introduce the load lifting arms 77, 77 beneath the load and also while the truck is being moved about carrying the elevated load to the place of deposit and while depositing the load.

This advantage is a distinct betterment over the prior constructions of this general character where one hydraulic lifting cylinder has been used directly in front of the operator thereby losing in substantial measure the badly needed perceptibility and discernment for safety and efficiency of performance.

When the operating oil under sutiable pressure is simultaneously admitted into both cylinders below their pistons two things happen, (a) their pair of pistons immediately initiate the ascent of the outer frame through its top-plate 47, such frame rising at the same speed as that of the ascent of the pistons, and (b) since shaft 66 and its two sprocket-wheels 67, 67 also mount at the same speed, but due to their connections with the pairs of chains at intermediate points along their length, the lift-frame 73 and its load lifters 77, 77 rise twice as fast as such outer frame, the lift-frame sliding upwardly on such frame while the latter is also ascending.

Owing to the operative tying together of the two chains through the pair of sprocket-wheels and their shaft an efficient distribution of the strains and stresses is assured even though the load may be unevenly distributed on the lift-feet 77, 77.

By means presently to be described, all of the oil under pressure may be fed into either cylinder alone only, that causing twice the speed of lift of that produced when both cylinders are simultaneously operative, but owing to the chains, sprocket-wheels and shaft connection, the load is satisfactorily distributed on the parts of the mechanism.

As has been indicated above, the load-lifting part of the appliance may be tilted somewhat forwardly to assist in getting the lifter under the load and it may be tilted somewhat rearwardly to assure that the load will not fall off of the lifter, and an arrangement has been provided so that the lifting or lowering may occur simultaneously with either the tilting rearwardly or forwardly.

For manual control of the oil or other fluid under pressure governing the operation of the load lifting and lowering appliance and the forwardly and rearwardly tilting-means, a main multiple-valve, shown only diagrammatically in Figure 19 and designated as a whole 91, is employed and not internally detailed here because it is fully illustrated and described in United States Patent No. 2,247,141, Twyman, Multiple valve bank, granted June 24, 1941, such valve 91 employing one each, 100 and 200, of the single and double acting control-valves of the plurality set forth in such patent, valve 100 controlling the load lifting and lowering, and valve 200 the tilting of the load lifting and lowering means.

Such two valves in the present case are manually reciprocatory to different operative positions by their externally exposed stems or shanks 92, 93 by a single upstanding handle 94 (Figure 14) in easy reach of the operator of the vehicle, which handle can be shifted from a neutral, upright position to any one of eight different positions to cause various operations to take place (Figs. 14, 15, 16, 17).

As is portrayed in detail in Figure 14, such handle 94 intermediate its length is equipped with a ball occupying a companion stationary socket forming joint 194 whereby the handle may be rocked in any of the eight directions, 1 to 8 inclusive, illustrated by the arrows, the lower end of such handle 94 having a ball-and-socket connection 192 with one end of a rod or link 292 whose other end has a pivotal ball-and-socket connection 392 with the slidable valve-stem 92, the lower part of such handle 94 having also another ball-and-socket connection 193 with one end of a link or rod 293 whose opposite end has a pivotal ball-and-socket connection 393 with one arm of a bell-crank lever 493 fulcrumed at 593, and the other arm of which lever is joined through a pivotal ball-and-socket joint 693 with one end of a link 793 whose opposite end is connected to valve-stem 93 through a pivoted ball-and-socket connection 893.

As is illustrated diagrammatically in Figure 19, the hydraulic-system of the appliance includes an hydraulic-fluid reservoir 101 connected to the inlet of a suitable pump 102 by a conduit 103 equipped with an appropriate strainer 104, the outlet of the pump being joined to the admission-port 106 of valve 91 by a pipe 105.

The port 107 of hoist-valve 100 is connected by a tube 108 through a reverse-flow control-valve 109 and by tube 111 to the port of one of the two hoist-cylinders 52, conduit 108 being also united with the port of the companion cylinder 52 through a conduit 112 fitted with a directional control-valve 113, the latter being united by a conduit 114 leading back to the reservoir 101, such member 114, however, being also joined at 115 to the port 116 of valve 91.

Port 117 of tilting-control valve 200 is connected to the interiors of the corresponding ends of the two tilt-cylinders 37, 37 through a conduit 118 fitted with a check-valve with orifice 119 and bifurcated at 121, the interiors of the opposite ends of such two companion tilt-cylinders 37, 37 being joined by a pipe or tube 122 bifurcated at 123 and fitted with a flow-limiting orifice member 124, such conduit 122 leading back to another port 125 of valve 200.

The reverse-flow control-valve 109 referred to above is shown in section in Figure 18. Its function is to provide free flow into the hoist-cylinders at all times but to limit the flow therethrough to a predetermined rate when the oil returns from such cylinders. This return flow is unrestricted when the hoist is lowered with light loads or no loads, but is confined to limited speeds when heavier, more dangerous loads are being handled.

In such sectional view (Fig. 18), the direction of fluid-flow, when raising the hoist-cylinders, is indicated by the arrows. Obviously, during the lowering stage the flow reverses and when it reaches a certain velocity its resulting force, due to striking the baffle 209 on the end of plunger 309 pulls the plunger down against the pressure of coiled spring 409 and it occupies the orifice 509, but the fluid, however, continues to escape through the valve through two small key-way like slots 609, 609 cut in the opposite sides of the plug, this flow continuing to hold the plug down in its seat and limiting the return of the hydraulic-fluid to a rate predetermined by the size of the slots 609 of the plug.

Referring now to Figure 14 with the handle 94 shifted rearwardly, as shown by arrow 5, this represents the condition when the lift is being elevated by both the two power cylinders 52, 52, the hoist-valve spool of valve 100 (Fig. 19) being in its out-position and the tilt-valve spool of valve 200 being in its neutral position. Under these circumstances the pump 102 taking its oil from the reservoir 101 through pipe 103 and strainer 104 forces it through conduit 105, a portion of valve 91, then through pipe 108, valve 109 and the connections 111 and 112 to the hoist-cylinders 52, 52. Under these conditions no oil is being forced to either of the tilt-cylinders 37.

In the diagram Figures 20 to 32 inclusive the conduits, etc., accommodating oil under dynamic pressure are indicated in solid black lines, those occupied by oil not under dynamic pressure are represented in black dotted lines, and those which are under static pressures are shown in thin or narrow lines, or vacant.

Figure 20:
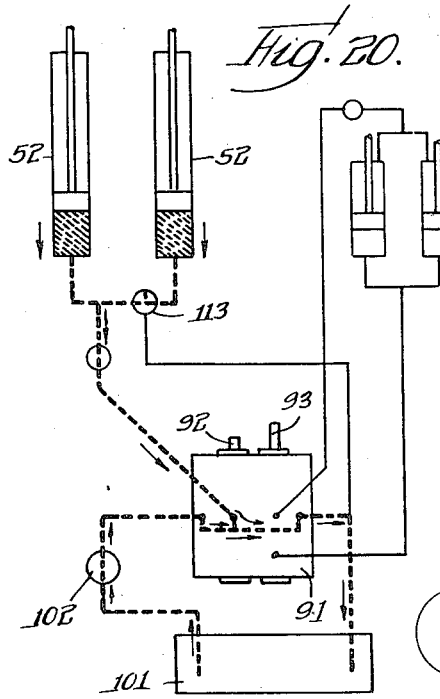

When the handle 94 is rocked forwardly, as shown in Figure 20, the hoist is descending after having been raised to elevated position, as indicated in Figure 19 and under these circumstances valve-stem 92 is in its in-position and valve-stem 93 in its neutral position. At this time the pump is merely receiving oil from the reservoir and constantly feeding it back into such reservoir through valve 91 and the oil from the hoist-cylinders is also being delivered through valve 91 back to the reservoir.

Figure 21:
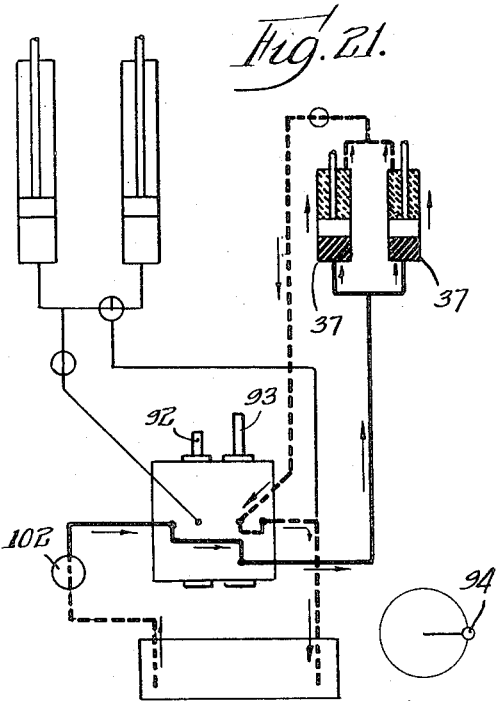

Figure 21 depicts the condition when the framework is being tilted forwardly, the handle 94 occupying the relation indicated. In this case no oil is being forced to either of the hoist-cylinders and is only being fed into one end of each of the two companion tilt-cylinders, but oil is also being delivered from the other ends of the same tilt-cylinders back to the reservoir, as is clearly presented. Under these circumstances, the stem 92 of valve 100 is in its neutral position and that 93 of valve 200 is in its out-relation.

Figure 22:
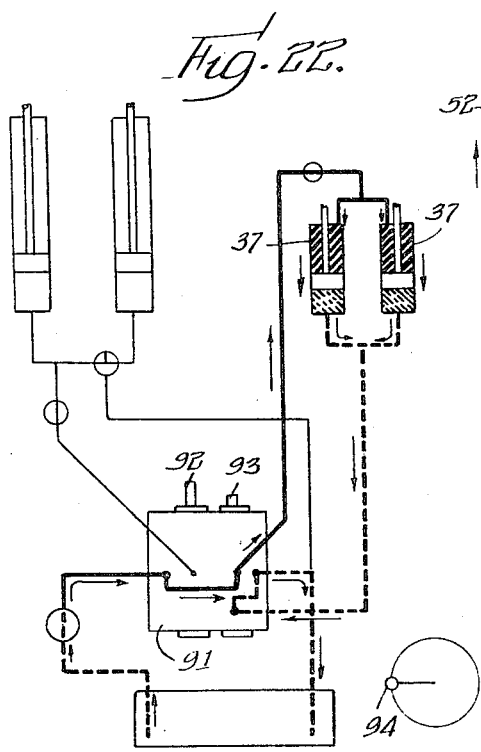

Figure 22 represents the status of things when the oil under pressure is being fed into the two tilt-cylinders at their ends opposite to that which was being fed in Figure 21 and this is the situation when the framework is being rocked rearwardly with the handle 94 in the position illustrated, in which case the stem 92 of valve 100 is in its neutral position and the stem 93 of valve 200 is in its in-position.

Figure 23:
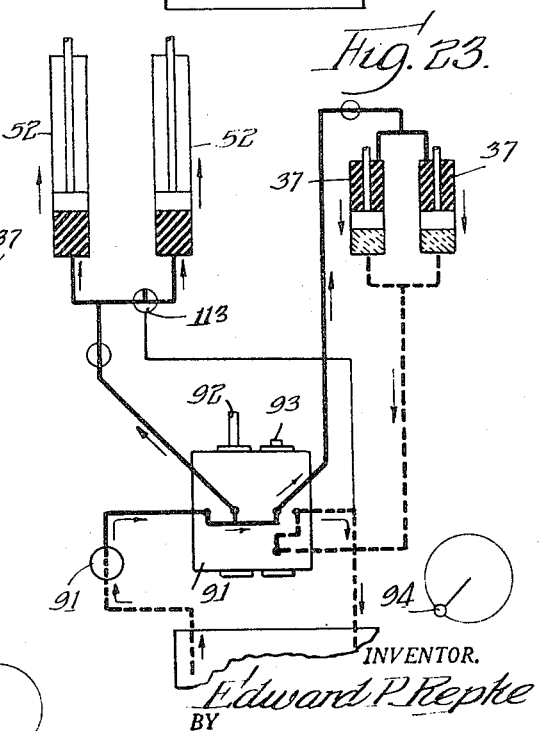

Figure 23 shows the handle 94 in the relation which it occupies when the two hoist-cylinders are elevating the lift and the latter at the same time is being rocked rearwardly. In that case stem 92 of valve 100 is in its out-position and stem 93 of valve 200 is in its in-relation.

Figure 24:
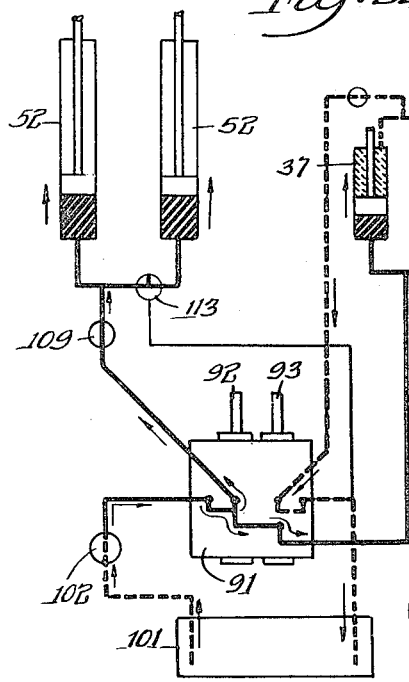

No difficulty will be experienced in understanding the situation as illustrated in Figure 24 with the handle 94 in the oblique location indicated in such figure. That is to say, the lift is being raised by both cylinders and rocked forwardly simultaneously, both valve-stems being in out-positions.

Figure 25:
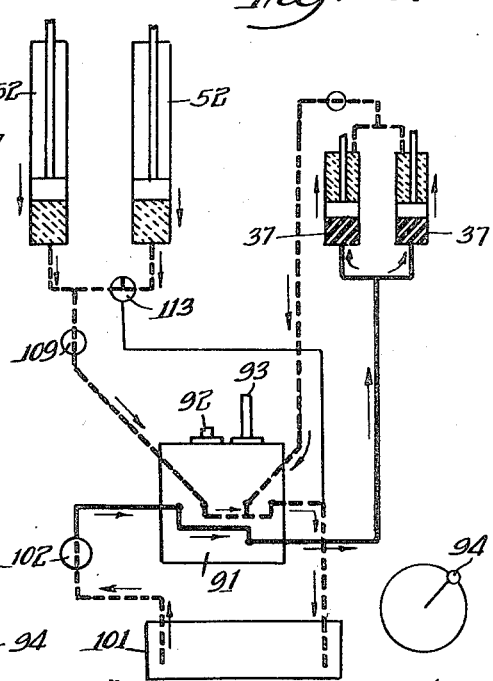

Figure 25 shows handle 94 in a forward oblique relation employed while the two hoist-cylinders are descending and the lift is at the same time being rocked forwardly, and, under these circumstances, stem 92 of valve 100 is in its in-position and stem 93 of valve 200 is in its out-position.

Figure 26:
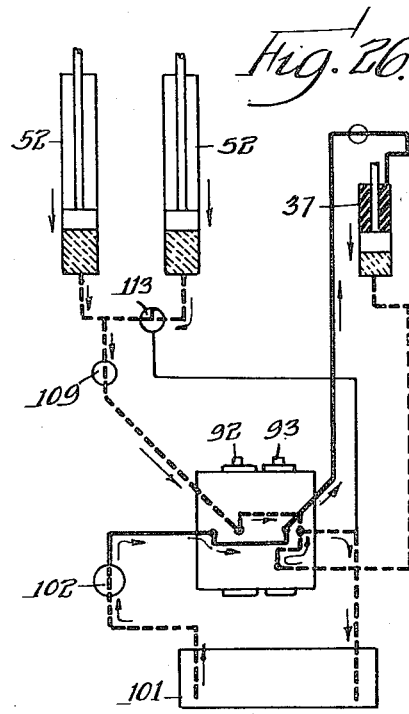

In Figure 26 the handle 94 is in the other forward oblique position with both stems of both valves in their in-positions, this being the case when the two hoist-cylinders are descending and the lift is simultaneously being rocked rearwardly.

Figure 27:
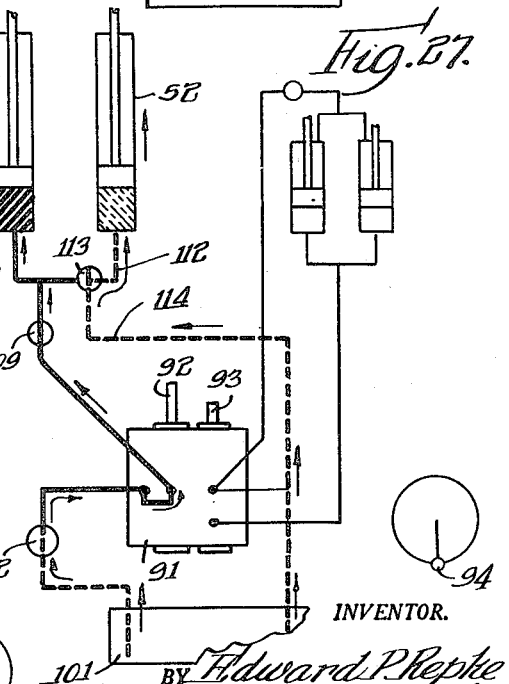

When one hoist-cylinder only is being power-operated and there is no tilt in either direction occurring, the handle 94 is in its rear position and the valve 113 is turned manually to connect conduit 112 with conduit 114 and the two valves 100 and 200 are in the position indicated in Figure 27, which is the same condition which is also presented in Figure 19, but in this instance the oil under pressure is fed only to the left-hand hoist-cylinder 52 yet, since the two pistons of the two hoist-cylinders ascend at the same time, in order not to create a vacuum in the right-hand hoist-cylinder it sucks in liquid direct from the reservoir, as will be readily understood.

In order to lower the lift after it has been raised by the left-hand cylinder solely, as shown in Figure 27, the handle 94 is shifted to occupy the forward position, as presented in Figure 28, with stem 92 in in-position and stem 93 at neutral-position, and then the oil from both cylinders can flow back into the reservoir, and during this occurrence the pump is idly pumping oil from the reservoir back through valve 91 to the reservoir without performing any work.

If it is desired to lift the hoist by the left-hand hoist-cylinder alone and at the same time tilt it rearwardly, the handle 94 is moved to the rear oblique position presented in Figure 29 in which instance the stem 92 of the valve 100 is out and the stem 93 of valve 200 is in.

The condition which is presented when the lift is being elevated by the left-hand cylinder only and is simultaneously being tilted forwardly is portrayed in Figure 30 with the handle 94 in the opposite oblique rear position, at which time the stems 92 and 93 of both valves are both in their out-position.

Figure 31 illustrates the condition when the lift is being lowered, after having been first raised by the left-hand cylinder 52 and is being also simultaneously rocked forwardly with the handle 94 in the forward oblique relation shown, in which case stem 92 is in and stem 93 is out.

Figure 32 shows a somewhat similar condition with the handle 94 in the inner, forward, oblique position shown, this being the case when the lift is being lowered after having been raised first by such left-hand single hoist-cylinder alone, and is also being concurrently rocked rearwardly. At this time the stems of both valves 100 and 200 are in their innermost positions.

In case it is desired to use the right-hand hoist-cylinder 52 singly instead of the left-hand one, no difficulty will be encountered by one skilled in the art in providing such connections as may be needed to accomplish such result.

In order that this novel and innovatory structure could be readily understood both as to structure and mode of operation it has herein been described in substantial detail, but it is to be understood that the invention is not necessarily limited and restricted to all such minor factors, and that various modifications may be availed of without departure from the heart and essence of such invention and without the loss or sacrifice of any of its substantial benefits and advantages.

Whereas, hereinabove, only eight positions of valve-handle 94 have been referred to it is to be borne in mind that it can occupy any one or more of a large number of intermediate positions with corresponding modifications of the operations of the two valves 100 and 200 as to provide different throttling actions as may at times be desired.

I claim:

In a vehicle-truck lift of known general form having a first upstanding frame on the front portion of the truck, means rockingly mounting said first frame on said truck to tilt forwardly or rearwardly, hydraulic-means to so tilt said frame and the parts which it carries, a second upstanding frame slidable up and down on said first frame, a load lifting frame, a load lifting and lowering member, a pair of chains each connected to said first frame and to said load lifting and lowering member, and a pair of sprocket-wheels on said second frame intermeshing individually with said chains, the novel combination of a rotarily mounted shaft on the upper portion of said second frame on which shaft said sprocket-wheels are fixed to rotate in unison with the shaft, a pair of upstanding hydraulic-cylinders and their pistons spaced apart horizontally to afford between them front visibility to the operator of the truck, means securing said pistons to said second frame, and means to admit operating fluid under pressure into, and to discharge it from, at least one of said cylinders to operate said lift, and means to feed operating fluid into and from said hydraulic-means to tilt said combined frames simultaneously selectively either forwardly or rearwardly.

EDWARD P. REPKE.

REFERENCES CITED

The following references are of record in the file of this patent:

UNITED STATES PATENTS

| Number | Name | Date |
| --- | --- | --- |
| 446,799 | Thorpe | Feb. 17, 1891 |
| 2,224,725 | Felt, Jr. | Dec. 10, 1940 |
| 2,281,004 | Lehmann et al. | Apr. 28, 1942 |
| 2,350,909 | Lapsley | June 6, 1944 |
| 2,391,881 | Clay | Jan. 1, 1946 |
| 2,394,458 | Lull | Feb. 5, 1946 |
| 2,399,632 | Guerin | May 7, 1946 |